United States Patent
Sienko et al.

(10) Patent No.: US 11,502,717 B2
(45) Date of Patent: Nov. 15, 2022

(54) MULTIPLE ELEMENT MIXER WITH DIGITAL LOCAL OSCILLATOR SYNTHESIS

(71) Applicant: QUALCOMM Incorporated, San Diego, CA (US)

(72) Inventors: Matthew Sienko, San Diego, CA (US); Peter Shah, San Diego, CA (US); Francesco Gatta, San Diego, CA (US)

(73) Assignee: QUALCOMM Incoporated, San Diego, CA (US)

( * ) Notice: Subject to any disclaimer, the term of this patent is extended or adjusted under 35 U.S.C. 154(b) by 0 days.

(21) Appl. No.: 17/156,352

(22) Filed: Jan. 22, 2021

(65) Prior Publication Data

US 2022/0247445 A1  Aug. 4, 2022

(51) Int. Cl.
*H04B 1/40* (2015.01)
*H04L 27/227* (2006.01)

(52) U.S. Cl.
CPC ............ *H04B 1/40* (2013.01); *H04L 27/227* (2013.01)

(58) Field of Classification Search
CPC ...... H04B 1/04; H04B 1/0475; H04B 1/0483; H04B 1/10; H04B 1/16; H04B 1/38; H04B 1/40; H04B 1/58; H04B 2001/0491; H04L 27/20; H04L 27/2053; H04L 27/22; H04L 27/227; H04L 27/2272; H04L 27/2273

USPC ....... 375/219, 260, 283, 296, 324, 327, 328, 375/330, 349; 370/358, 366, 388; 455/114.3, 127.4, 199.1, 253.2

See application file for complete search history.

(56) References Cited

U.S. PATENT DOCUMENTS

| | | | | |
|---|---|---|---|---|
| 7,190,943 | B2 * | 3/2007 | Davis ....................... | H03C 3/40 455/313 |
| 8,285,240 | B2 * | 10/2012 | Seendripu ................ | H04B 1/26 455/317 |
| 9,071,197 | B2 | 6/2015 | Vora et al. | |
| 9,531,409 | B2 | 12/2016 | Butterfield et al. | |
| 2008/0132195 | A1 * | 6/2008 | Maxim ..................... | H04B 1/28 455/334 |
| 2008/0180579 | A1 * | 7/2008 | Maxim .................. | H04B 1/001 348/735 |
| 2018/0019707 | A1 * | 1/2018 | Matsumoto .......... | H03D 7/1483 |
| 2018/0091098 | A1 * | 3/2018 | Duncan ................ | H03D 7/1441 |
| 2019/0165820 | A1 * | 5/2019 | Xu .......................... | H03M 3/47 |
| 2020/0028664 | A1 * | 1/2020 | Mallinson ............. | H03L 7/0991 |

* cited by examiner

*Primary Examiner* — Young T. Tse
(74) *Attorney, Agent, or Firm* — Haynes and Boone, LLP

(57) ABSTRACT

A switching mixer array is disclosed for the mixing of a digital LO signal with an analog input signal. Each switching mixer in the array is configured to assume either a first switching state or second switching state responsive to a respective bit of the digital LO signal.

27 Claims, 11 Drawing Sheets

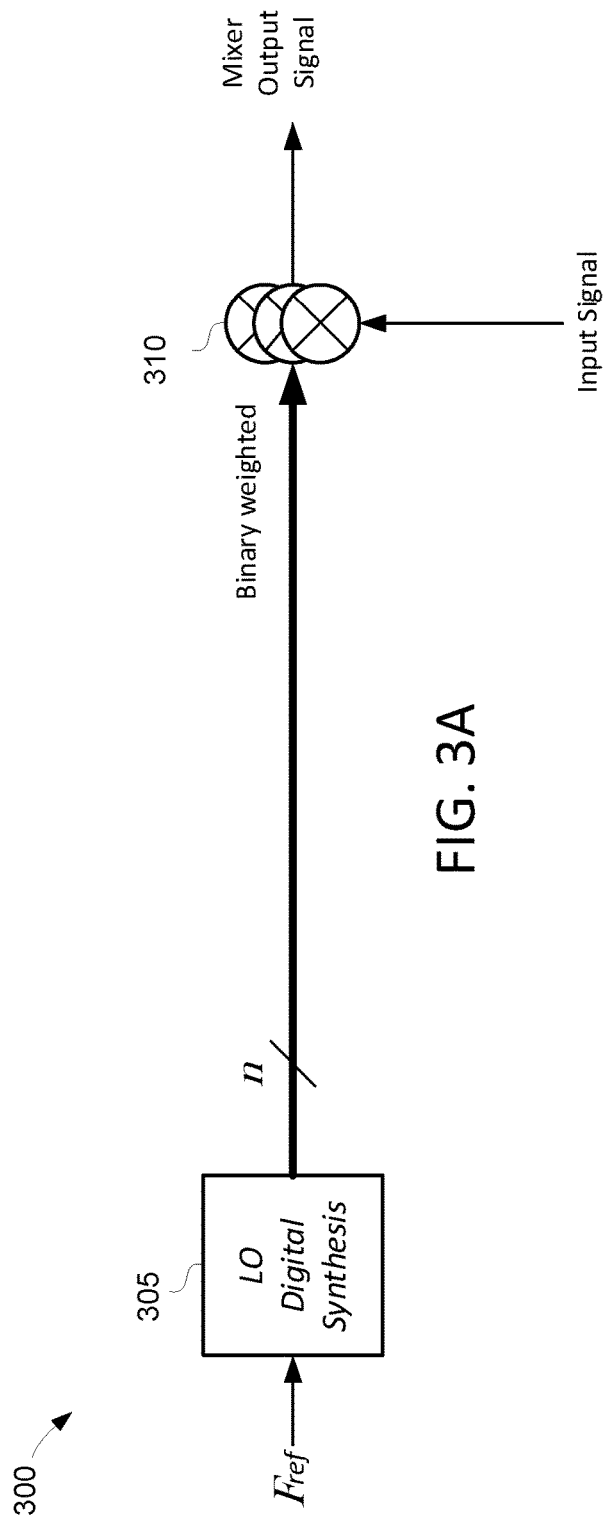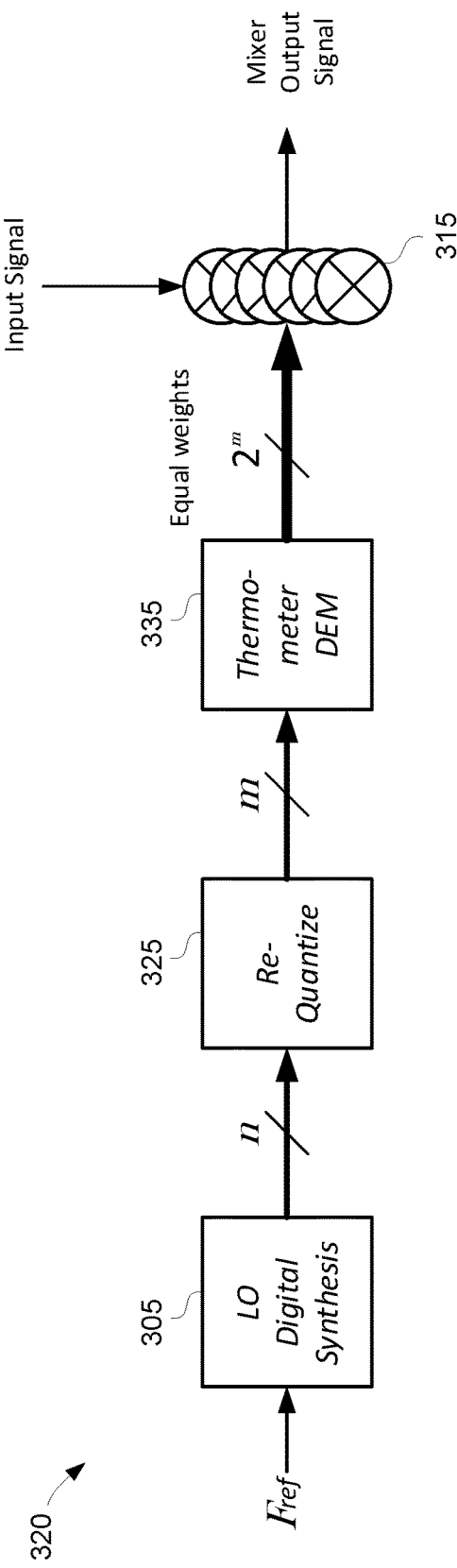
FIG. 3A
FIG. 3B

MULTIPLE ELEMENT MIXER WITH DIGITAL LOCAL OSCILLATOR SYNTHESIS

TECHNICAL FIELD

This application relates to mixers, and more particularly to a mixer with a digital local oscillator synthesis.

BACKGROUND

The generation of a local oscillator (LO) signal is of fundamental importance in both transmitters and receivers for frequency translation. In a transmitter, the LO signal is mixed with an analog baseband signal to upconvert the analog baseband signal either directly to radio frequency (RF) or to RF through an intermediate frequency (IF) stage. Similarly, the LO signal is mixed with a received RF signal in a receiver to down convert the RF signal either to baseband or to IF.

Despite the fundamental importance of LO signal generation, existing LO signal synthesizers may suffer from a number of issues. For example, an LO signal may be generated in an analog fashion using a suitable oscillator such as a phase-locked loop (PLL). An integer-N PLL generates the LO signal in a feedback loop that is driven by an input signal such that the LO signal frequency is an integer multiple of the input signal frequency. This limitation on the LO frequency is problematic if the LO signal is to be tuned across one or more frequency bands. Fractional-N PLLs provide better frequency agility but suffer from spurs and jitter. In addition, adjacent PLLs will tend to interact and frequency pull each other.

SUMMARY

In accordance with a first aspect of the disclosure, a multiple element mixer is disclosed for mixing an input signal that includes: a digital source configured to generate a digital local oscillator signal; and a plurality of switching mixers, each switching mixer configured to mix a respective bit from the digital local oscillator signal with the input signal.

In accordance with a second aspect of the disclosure, a method of mixing to form a mixer output signal is provided that includes: generating a first digital local oscillator signal having a plurality of first in-phase bits and a plurality of first quadrature-phase bits; for each first in-phase bit and corresponding first quadrature-phase bit, configuring a respective switching mixer from an array of switching mixers by closing a first switch in the respective switching mixer responsive to the first in-phase bit being true, closing a second switch in the respective switching mixer responsive to the first in-phase bit being false, closing a third switch in the respective switching mixer responsive to the corresponding first quadrature-phase bit being true, and closing a fourth switch in the respective switching mixer responsive to the corresponding first quadrature-phase bit being false to form an array of configured switching mixers; driving an input signal through the array of configured switching mixers to form a corresponding plurality of mixed output signals; and combining the mixed output signals to form the mixer output signal.

In accordance with a third aspect of the disclosure, a multiple element mixer for an analog input signal is provided that includes: a digital source configured to generate a digital local oscillator signal having a first plurality of bits; a re-quantizer configured to re-quantize the digital local oscillator signal into a re-quantized digital local oscillator signal having a second plurality of bits that is smaller than the first plurality of bits, the second plurality of bits including a set of most significant bits and a set of least significant bits; a segmented dynamic element matching (DEM) generator configured to generate a first set of DEM scrambled bits from the set of most significant bits and to generate a second set of DEM scrambled bits from the set of least significant bits; a plurality of first switching mixers, each first switching mixer configured to mix a respective bit from the first set of DEM scrambled bits with the analog input signal to drive an output terminal configured to provide a mixer output signal; and a plurality of second switching mixers, each second switching mixer configured to mix a respective bit from the second set of DEM scrambled bits with the analog input signal to drive the output terminal.

In accordance with a fourth aspect of the disclosure, a multiple element mixer for an analog input signal is disclosed that includes: means for generating a digital local oscillator signal having a plurality of bits; a plurality of switching means corresponding to the plurality of bits, each switching means for mixing a respective bit from the plurality of bits with an input signal to form a switching mixer output signal; and means for combining the switching mixer output signals to form a mixer output signal.

These and other advantageous features may be better appreciated through the following detailed description.

BRIEF DESCRIPTION OF THE DRAWINGS

FIG. 3A illustrates a binary-weighted switching mixer array system in accordance with an aspect of the disclosure.

FIG. 3B illustrates a unary-weighted switching mixer array system in accordance with an aspect of the disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

To avoid PLL coupling and pulling yet provide instantaneous on-the-fly frequency changing or tuning, digital LO generators have been developed. To provide a digital LO signal to a digital LO generator, various digital circuits such as a look-up table or a coordinate rotation digital computer (CORDIC) may be used. A digital-to-analog converter (DAC) in the digital LO converter then converts the digital LO signal into an analog signal. An image filter filters the analog signal to produce a filtered analog signal to remove the DAC images. A limiter processes the filtered analog signal to produce the analog LO signal. In a transmitter, a mixer may then mix the analog LO signal with a baseband (or intermediate frequency) signal to produce a radio frequency (RF) signal. Conversely, a receiver may use a mixer to mix the analog LO signal with a received RF signal to produce an intermediate frequency or baseband signal. But the image filter in the digital LO generator introduces noise. Similarly, the limiter in the digital LO generator introduces LO harmonics, phase noise, aliasing products, and intermodulation components into the analog LO signal.

To avoid these issues, improved mixers are disclosed herein. In these improved mixers, an input signal such as a radio frequency (RF) signal or a baseband signal is mixed directly with a digital LO signal in a plurality of switching mixers. The mixing of the input signal in parallel through a plurality of switching mixers with the digital LO signal has a number of benefits as compared to the analog conversion of the digital LO signal in a DAC so that an analog LO signal may be mixed with the input signal. As discussed earlier, the use of a DAC then requires an image filter and a limiter that may then pollute the mixing with LO harmonics, phase noise, and intermodulation products. But these problems are avoided through the plurality of switching mixers with digital local oscillator synthesis as disclosed herein.

The number of switching mixers depends upon the encoding of the digital local oscillator signal. Regardless of how the digital LO signal was encoded, each of its bits corresponds to a respective switching mixer such that there is at least one switching mixer corresponding to each bit. For example, suppose that the digital local oscillator signal in a binary encoding is N bits wide, N being a positive plural integer. A binary-weighted implementation would thus have at least N switching mixers: one for each bit. The input signal being mixed may be weighted according to the binary significance of the bit for the corresponding switching mixer. If instead the digital LO signal is unary encoded (thermometer encoded), the input signal would be equally weighted in each switching mixer. In the resulting thermometer-encoded implementation, there would be at least $2^N$ switching mixers, one for each bit of the unary-encoded digital LO signal.

Figure 1A:
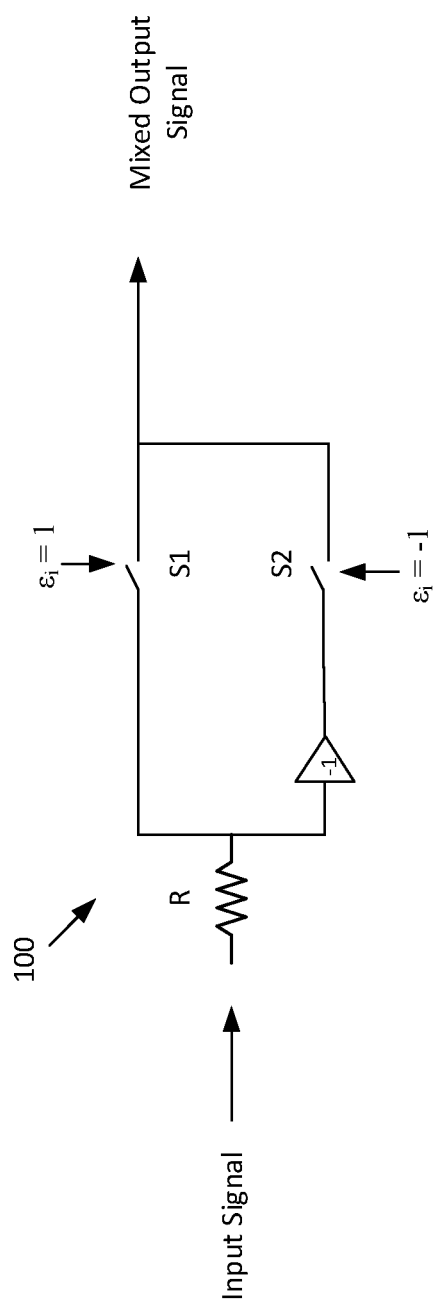
FIG. 1A illustrates a single-ended switching mixer for use in a mixer array in accordance with an aspect of the disclosure.

Although other types of encoding may be used to form a digital LO signal, the following discussion will be directed to switching mixer arrays corresponding to a binary encoding or a unary encoding of the digital LO signal without loss of generality. The switching mixer implementation depends upon whether the input signal is single-ended or differential. An example single-ended switching mixer 100 is shown in FIG. 1A that corresponds to an ith bit $\varepsilon_i$ of the digital LO signal. A single-ended input signal is weighted by conducting through a resistor R. Depending upon the state of the ith bit, one of two switches S1 and S2 are closed while the other is opened. In this case, the ith bit may be deemed to be of value +1 or −1. Should the value be +1, switch S1 is closed and switch S2 is open. Switch S1 couples between the resistor R and an output node for switching mixer 100 so the input signal (e.g., an RF signal, an IF signal, or a baseband signal) passes through to the output node without any inversion. But if the digital LO signal bit is a −1, switch S1 is opened and switch S2 closed. The input signal is inverted to drive the output node when switch S2 is closed. This inversion may be implemented using a suitable length of transmission line in some embodiments. A resulting single-ended mixed output signal from switching mixer 100 would then be combined with the corresponding output signal from the remaining switching mixers to produce the desired mixer output signal.

Figure 1B:
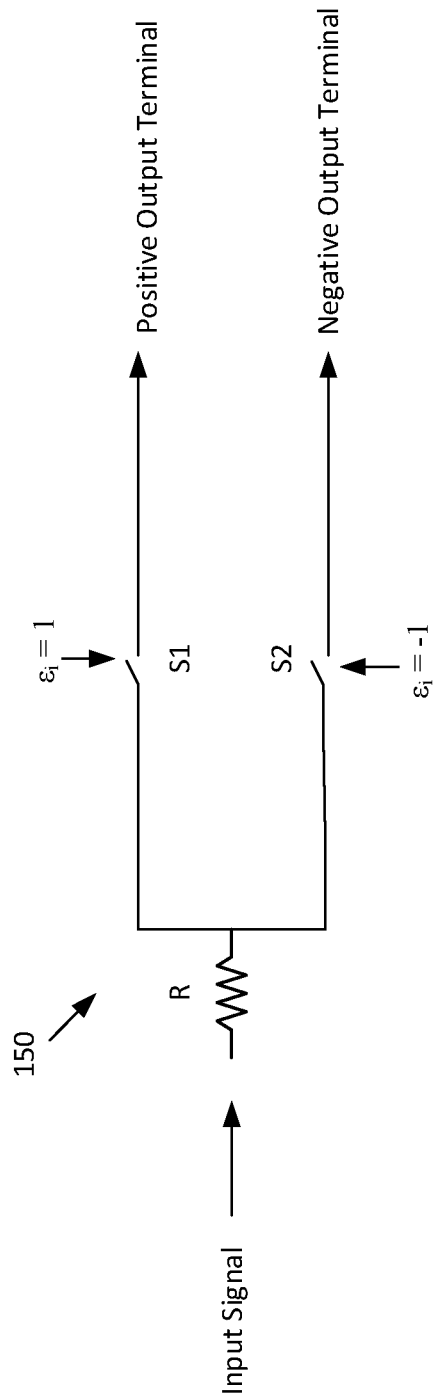
FIG. 1B illustrates a single-ended to differential switching mixer for use in a mixer array in accordance with an aspect of the disclosure.

An example single-ended-to-differential switching mixer 150 is shown in FIG. 1B. A differential output signal is formed across a positive output terminal and a negative output terminal. Switches S1 and S2 operate as discussed regarding switching mixer 100. The single-ended input signal is thus converted into a differential output signal through switching mixer 150.

Figure 2:
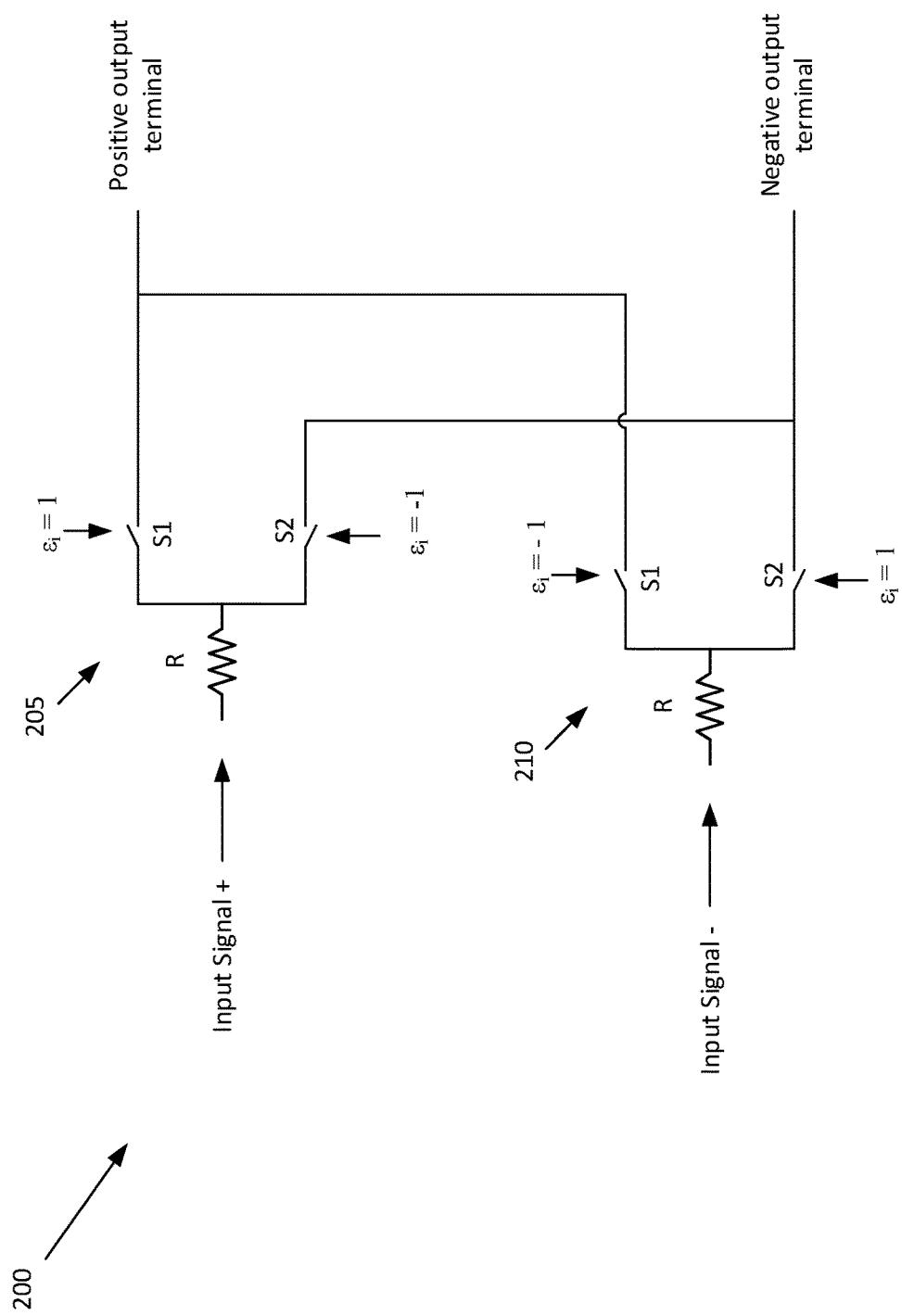
FIG. 2 illustrates a differential switching mixer for use in a mixer array in accordance with an aspect of the disclosure.

An example differential switching mixer 200 is shown in FIG. 2. Switching mixer 200 includes a single-ended-to-differential switching mixer 205 for the positive component of the differential input signal and a single-ended-to-differential mixer 210 for the negative component of the differential input signal. Both switching mixer 205 and switching mixer 210 include a pair of switches S1 and S2 and a resistor R arranged analogously as discussed for switching mixer 150. In switching mixer 205, switch S1 couples between the resistor R and a positive output terminal for the differential mixed output signal. Similarly, switch S2 couples between the resistor R and a negative output terminal for the differential mixed output signal. Should the digital LO signal bit equal +1, switch S1 is closed in switching mixer 205 so that the positive component of the input signal propagates out on the positive output terminal. If instead the bit is equals −1, switch S2 is closed in switching mixer 205 so that the positive component of the input signal propagates out on the negative terminal.

The remaining switching mixer 210 is the complement of switching mixer 205. If the bit equals −1, switch S1 is closed in switching mixer 210 so that the negative component of the input signal propagates through the resistor R and switch S1 to the positive output terminal. If the bit equals +1, it is switch S2 that is closed so that the negative component of the input signal propagates through the resistor R and switch S2 to the negative output terminal. It will be appreciated that the signal weighting performed by resistors R in switching mixers 100 and 200 may instead be performed by transconductors or through voltage scaling in alternative implementations. In addition, the signal weighting such as performed by resistors R may instead be conducted at the output terminals of the switching mixers in alternative implementations (or the weighting may be distributed across both the input and output terminals). The switching mixers disclosed herein may be implemented using passive switches such as shown for switching mixers 100, 150, and 200 or could be performed in an active circuit such as a Gilbert cell. Switching mixers 100, 150, and 200 may each be deemed to form an example of a switching means for mixing a respective bit from a digital LO signal with an input signal to form a switching mixer output signal.

The following discussion will illustrate the switching mixers in generic form, but it will be understood that their implementations will vary depending upon whether the input signal and the mixed output signal are single-ended or differential. To limit the number of switching mixers, it is convenient to keep the digital LO signal as being binary encoded. A resulting binary-weighted mixer array 300 is shown in FIG. 3A. A digital source 305 generates a digital LO signal responsive to a desired sampling frequency Fref. For example, digital source 305 may be a look-up table or a digital core configured to implement the CORDIC algorithm. These structures may be deemed to form an example of a means for generating a digital local oscillator signal having a plurality of bits. In the following discussion, it will be assumed that the digital source 305 produces the digital local oscillator signal using a binary encoding such that the term "digital local oscillator signal" without further limitation is assumed to be binary encoded and to be n bits wide. Since there are n bits, there are n corresponding switching mixers 310 such that there is at least one switching mixer for each bit. Each switching mixer 310 is configured into a switching state responsive to its bit. Referring again to switching mixers 100, 205, and 210, a first switching state has switch S1 closed and switch S2 open. A second switching state has switch S1 open and switch S2 closed. With switching mixers 310 configured into their switching states according to their bits, the input signal propagates through each switching mixer 310 to form a corresponding mixed output signal. The combination of the resulting mixed output signals forms a mixer output signal that is equivalent to the mixing of the input signal with an analog LO signal having the frequency synthesized in digital source 305.

As the number of n bits is increased, the resulting quantization noise is reduced from the digitization of the LO signal. In general, the required level of precision for the quantization will depend upon the system requirements. For example, suppose that a ten-bit width (n=10) is required to meet the desired system requirements in one implementation. Referring again to FIGS. 1A, 1B, and 2, the resistance R or weighting of each mixer will then depend upon the binary significance of the corresponding bit in the digital LO signal. An accurate matching of, for example, the switching mixer corresponding to the most-significant bit (MSB) of the digital LO signal to the switching mixer corresponding to the least-significant bit (LSB) of the digital LO signal becomes problematic as the quantization precision is increased.

The effect of mixer mismatch may be reduced in a unary-weighted switching mixer array 320 of equally-weighted switching mixers 315 shown in FIG. 3B. A digital source 305 generates an n-bit wide digital LO signal at the sampling rate Fref as discussed for switching mixer array 300. Due to the quantization, the n-bit wide digital LO signal may have quantization errors. In addition, switching mixers 315 may have scaling errors or mismatches. The resulting errors from the quantization and mismatches may become periodic at a beat frequency resulting in multiple undesirable frequency components being introduced into the mixer output signal. To effectively convert the quantization error into white noise, the number of bits n in the n-bit digital LO signal has a magnitude to reduce the quantization error to an acceptable level. The n-bit digital LO signal may then be re-quantized in a re-quantizer 325 to a lower precision of m bits, where m is less than n. Although this re-quantization also adds quantization error, the error will no longer be periodic with the beat frequency. Note that the re-quantization may be eliminated in alternative implementations.

In lieu of re-quantization (or in addition to re-quantization), the quantization error may be addressed by an appropriate dithering to each sample of the digital LO signal generation. The resulting dithering effectively converts the quantization error into white noise.

The m-bit digital LO signal is then converted from a binary encoding to a thermometer encoding by a thermometer dynamic element matching (DEM) generator 335. With regard to this dynamic element matching, note that each switching mixer 315 is ideally exactly the same but in reality there are mismatches that could result in spurs in the mixer output signal. To address this mismatching, the dynamic element matching randomizes which switching mixer 315 is assigned to a corresponding thermometer-encoded bit. For example, suppose that m is 10 such that the thermometer code of the thermometer-encoded digital LO signal may range from 0 to 1027. If the value of the thermometer code is some value x (x being less than 1027), dynamic element matching generator 335 selects for x switching mixers 315 in a random fashion so that the effect of the mismatching is reduced. If the thermometer code equals 1027, then every switching mixer 315 is assigned a bit such that no dynamic element matching occurs. To address this potential value of the thermometer code, mixer array 320 includes at least one extra switching mixer 315 over the maximum value of the thermometer code. For example, if m equals 10, mixer array 320 may include 1028 switching mixers 315. In this fashion, a random selection of switching mixers 315 may be performed even as the thermometer code reaches its maximum value.

Figure 4:
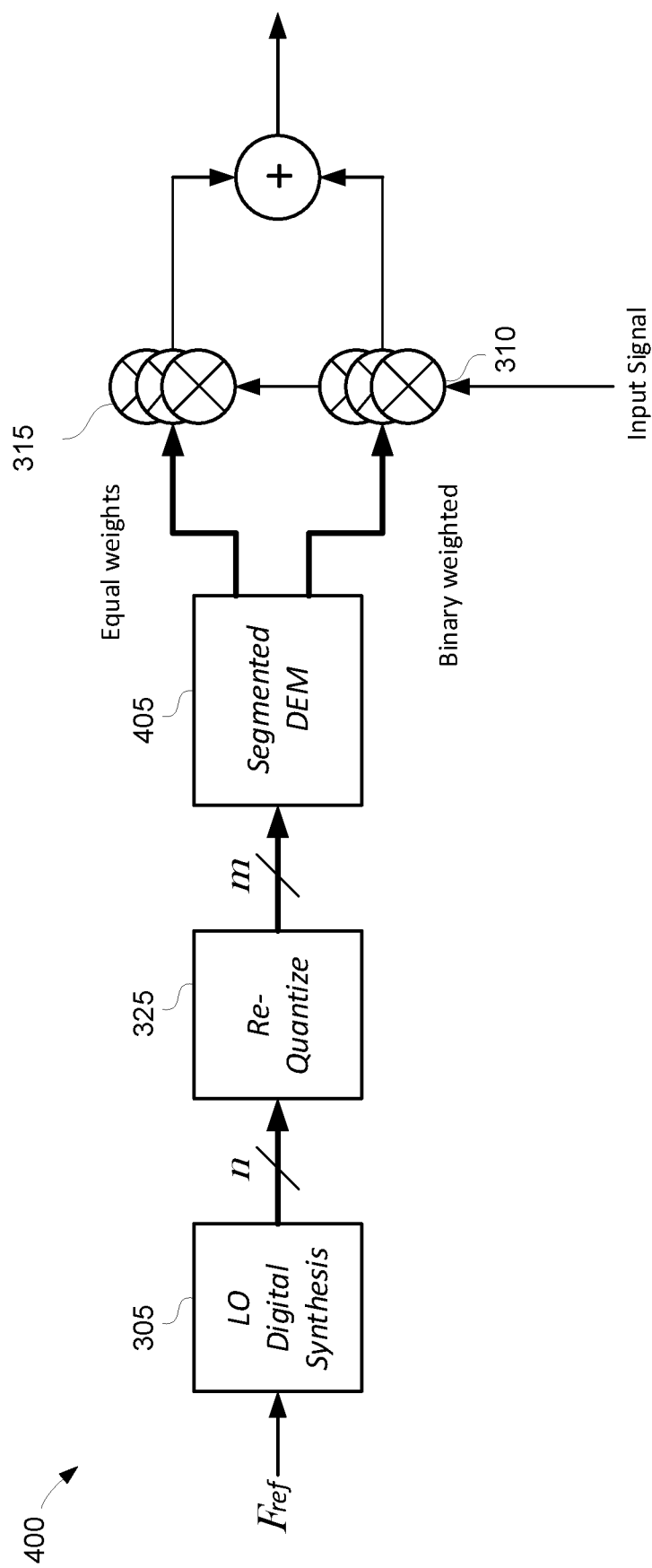
FIG. 4 illustrates a segmented switching mixer array system in accordance with an aspect of the disclosure.

Although the equally-weighted mixer array 320 avoids the mixer mismatches in binary-weighted mixer array 300, in some aspects it may be beneficial to reduce such a multiplicity of switching mixers 315. For example, mixer array 320 would include at least 4,096 switching mixers 315 should m equal 12. To reduce the size of the mixer array, a segmented (both binary and unary) mixer array 400 as shown in FIG. 4 may be provided. Digital source 305 and re-quantizer 325 function as discussed with regard to mixer array 320. A segmented dynamic element matching (DEM) generator 405 divides the binary-encoded m-bit wide digital LO signal from re-quantizer 325 into an MSB portion and an LSB portion. The MSB portion is thermometer encoded to drive a corresponding sub-array of equally-weighted switching mixers 315 whereas the LSB portion remains binary-encoded to drive an array of binary-weighted switching mixers 310. Regardless of whether the mixer array is segmented or not, the resulting mixer avoids the need for a limiter as may be used in a digital LO generator. A limiter is highly non-linear and introduces spurs in the mixer output signal. In sharp contrast, the LO path in the switching mixers disclosed herein is linear such that spur production is largely reduced or eliminated. The mixer arrays discussed herein may be deemed to form a plurality of switching means as discussed earlier.

Figure 5:
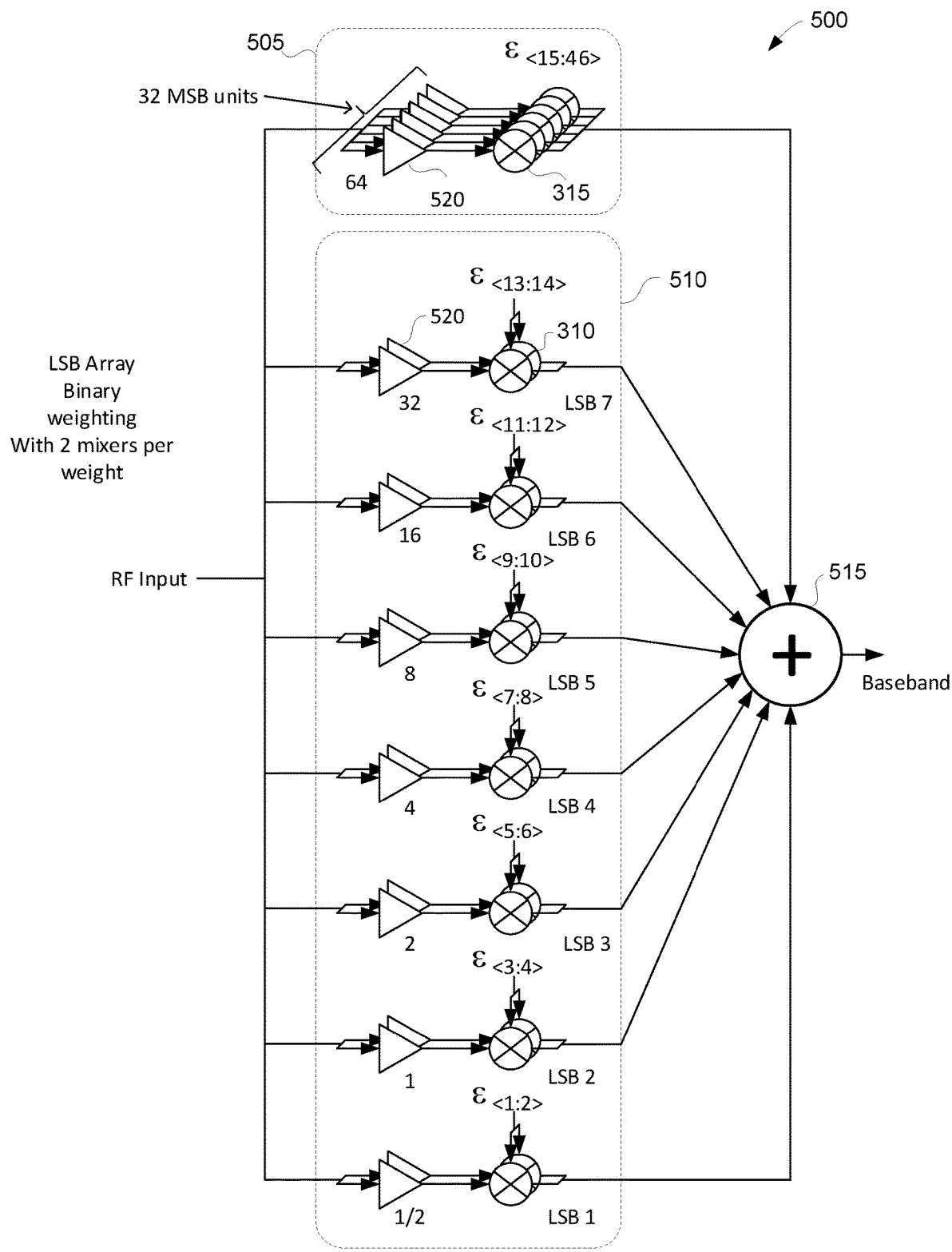
FIG. 5 illustrates a specific segmented switching mixer array for the segmented switching mixer array system of FIG. 4.

The segmented dynamic element matching applied by generator 405 may be better understood with regard to an example segmented array 500 shown in FIG. 5. In this embodiment, the bit width m of the re-quantized binary-encoded digital LO signal is 12. Of those 12 bits, the five MSBs are used to drive a unary section or sub-array 505 of equally-weighted switching mixers 315. Since there are five MSBs for sub-array 505, there are at least 32 switching mixers 315, one for each bit and at least one spare for DEM purposes. The remaining 7 LSBs drive a sub-array 510 of binary-weighted switching mixers 310. To provide a DEM shuffling for the binary-weighted mixers, each bit is assigned to a pair of switching mixers 310. There is a pair for the smallest LSB 1, a pair for the next-largest LSB 2, and so on such that there is a pair for the largest LSB 7. The weight for each switching mixer 310 (and also for each switching mixer 315) is represented by a buffer or multiplier 520. As noted earlier this signal weighting may be performed in a number of fashions such as through resistors, transconductors, or voltage scaling. In addition, the weighting may be performed at the outputs of switching mixers 310 rather than at their inputs. The pair of switching mixers 310 for the LSB 1 are each weighted by ½. Similarly, the pair of switching mixers 310 for the LSB 2 are weighted by 1, the subsequent pairs are weighted in the same binary procession such that the seven LSB weights in order are ½, 1, 2, 4, 8, 16, and 32. The unary weight for each switching mixer 315 in sub-array 505 is thus 64.

Referring again to switching mixers 100, 150, and 200, recall that their corresponding bit from the digital LO signal may be either +1 or −1. If each pair of switching mixers 310 in sub-array 510 is biased by a bit value of +1, a desired binary progression of 1, 2, 4, 8, 16, 32, and 64 is achieved for the seven LSBs. Suppose that the seven LSBs are encoding a numerical value of 1. In one DEM scramble or shuffle, segmented DEM generator 405 may assign the bits to the LSB 1 pair of switching mixers 310 to be +1 each. The remaining pairs of switching mixers 310 for LSB 2 through LSB 7 would be zeroed out so that one switching mixer 310 in each of these remaining pairs is biased by +1 and the remaining one by −1. But the same numerical value of one may be achieved by having the pair of switching mixers 310 for LSB 4 both be biased by +1 and by having the pairs of switching mixers 310 for LSBs 1 through 3 to be biased by −1. In this fashion, segmented DEM generator 405 may apply a DEM scrambling to the binary-weighted pairs of switching mixers 310. The mixed output signals from sub-arrays 505 and 510 are combined at an output node 515. This combining at node 515 may be passive or may be performed in an active combining network depending upon the implementation. Node 515 is an example of a means for combining the switching mixer output signals to form a mixer output signal.

In segmented DEM generator 405, each LSB is scrambled into a pair of bits for the corresponding pair of switching mixers 310. Since there are seven LSBs, there are seven pairs of corresponding bits. Segmented DEM generator 405 thus generates a pair of bits ε<1,2> for the LSB 1 pair of switching mixers 310, a pair of bits ε<3,4> for the LSB 2 pair of switching mixers 310, and so on such that there is a pair of bits ε<13,14> for the LSB 7 pair of switching mixers 310. In addition, segmented DEM generator 405 generates the bits ε<15,46> for the 32 switching mixers 315. In general, the bits a will depend upon the number of bits n and the MSB/LSB division in segmented DEM generator 405. It will be appreciated that alternative numbering conventions for the bits in segmented array 500 may be used.

The mixing disclosed herein is generic to either an up-conversion or a down-conversion of the input signal. For example, the input signal may be a baseband signal that is up-converted to an RF signal (or to an intermediate frequency (IF) signal). In that case, a filter would remove the down-converted low-frequency component from the mixer output signal. Alternatively, the input signal may be an RF signal as shown in FIG. 5 that is down converted to baseband (or to IF) in which case the filter would remove the up-converted high-frequency component from the mixer output signal.

Figure 6A:
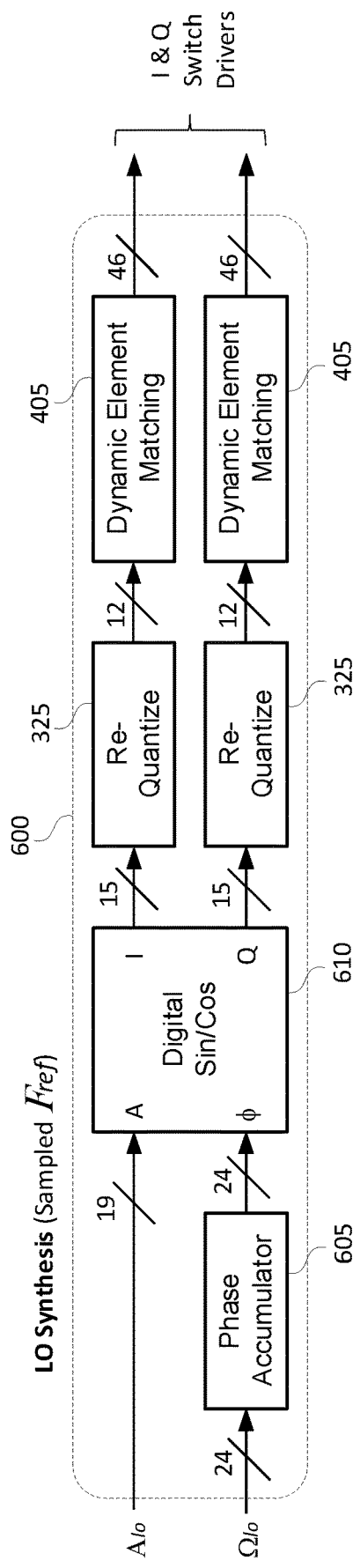
FIG. 6A illustrates a LO synthesis chain for the synthesis of an in-phase and a quadrature-phase digital LO signal in accordance with an aspect of the disclosure.

The switching mixers disclosed herein may also be used in a quadrature system in which the digital LO signal is either an in-phase (I) digital LO signal or a quadrature-phase (Q) digital LO signal. These digital LO signals are generated at the clocking rate or sampling rate Fref in an LO synthesis chain 600 of FIG. 6A. A digital source 610 generates the digital LO signals according to an LO amplitude ($A_{lo}$) that in this embodiment is 19 bits wide. A phase accumulator 605 accumulates a 24-bit wide phase φ at the sampling rate responsive to a phase increment $\Omega_{lo}$ beginning from a starting phase. The starting phase may be varied depending upon the desired phase shifts between different LO signals. Using the LO amplitude and phase, the digital source 610 generates a 15-bit wide I digital LO signal and a Q digital LO signal. Each of these digital LO signals is re-quantized to 12 bits in a respective re-quantizer 325 before being processed in a respective segmented DEM generator 405 to generate an I or Q set of the bits ε<1,46> such as discussed with regard to FIG. 5. In that regard, array 500 may be an I-phase or a Q-phase mixer array in an I/Q implementation.

Figure 6B:
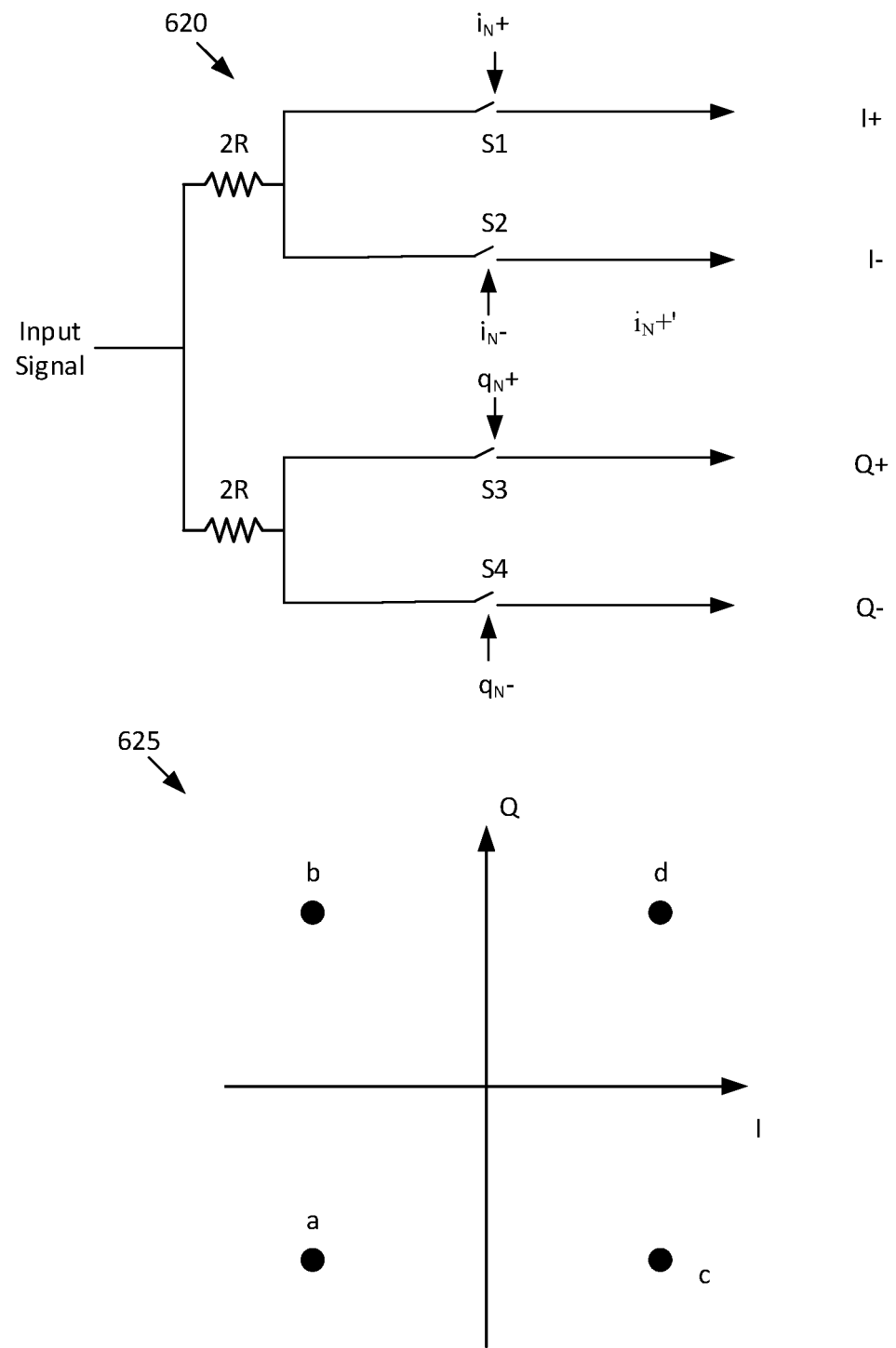
FIG. 6B illustrates a first I/Q switching mixer and a corresponding phase diagram for its output signals

The resulting in-phase and quadrature-phase bits for the LO signal are then used in a switching mixer such as discussed with regard to FIGS. 1A and 1B. Each of the in-phase and quadrature-phase LO bits may drive its own separate branch of a switching mixer on a bit-by-bit basis. For example, consider an arbitrary Nth in-phase bit $i_N$+ and its complement $i_N$− for the in-phase portion of the LO signal. This bit may be the LSB, the MSB or some weight in between these two values. The same weight bit for the quadrature portion of the LO signal may be represented as $q_N$+ and its complement $q_N$−. An example switching mixer 620 is shown in FIG. 6B that includes a pair of switches S1 and S2 and a pair of switches S3 and S4. Switches S1 and S2 form an in-phase branch whereas switches S3 and S4 form a quadrature-phase branch. Each branch couples through a corresponding resistance 2R to an input node. Depending upon the value of the in-phase LO bits, either switch S1 or switch S2 is closed and the other switch is opened. Switch S1 connects to a positive in-phase output terminal I+ whereas switch S2 connects to a negative in-phase output terminal I−. Switch S1 closes if the $i_N$+ bit is true whereas switch S2 closes if the $i_N$− bit is true. In the quadrature-phase branch, either switch S3 or switch S4 is closed depending upon the value of the quadrature-phase LO bits. Switch S3 connects to a positive quadrature-phase output terminal Q+ whereas switch S4 connects to a negative quadrature-phase output terminal Q−. Switch S3 is controlled by the $q_N$+ bit whereas switch S4 is controlled by the $q_N$− bit. Each remaining weight/bit of the in-phase and quadrature-phase portions of the LO signal would drive their own respective switching mixers that would also each drive the I+, I−, Q+, and Q− output terminals in common.

A phase diagram 625 for the resulting in-phase and quadrature-phase mixing by switching mixer 620 is also shown in FIG. 6B. Should the in-phase bit $i_N$− and the quadrature-phase bit $i_Q$− of the LO signal both be true, the resulting phase of a combination from the in-phase (I) and quadrature-phase output (Q) of the switching mixer 620 is represented by a point a. If the in-phase bit $i_N$− is still true but the quadrature-phase bit $q_N$+ is also true, then the phase of the combined signal is represented by a point b. If the in-phase bit $i_N$+ and the quadrature-phase bit $q_N$− are both true, the phase of the combined signal is represented by a point c. Finally, if the in-phase bit $i_N$+ and the quadrature-phase bit $q_N$+ are both true, the phase of the combined signal is represented by a point d. Although switching mixer 620 is advantageous as compared to a conventional mixer architecture, an improved noise figure and increased output signal amplitude may be achieved by transforming the LO signal bits responsive to a coordinate transformation as follows.

Figure 6C:
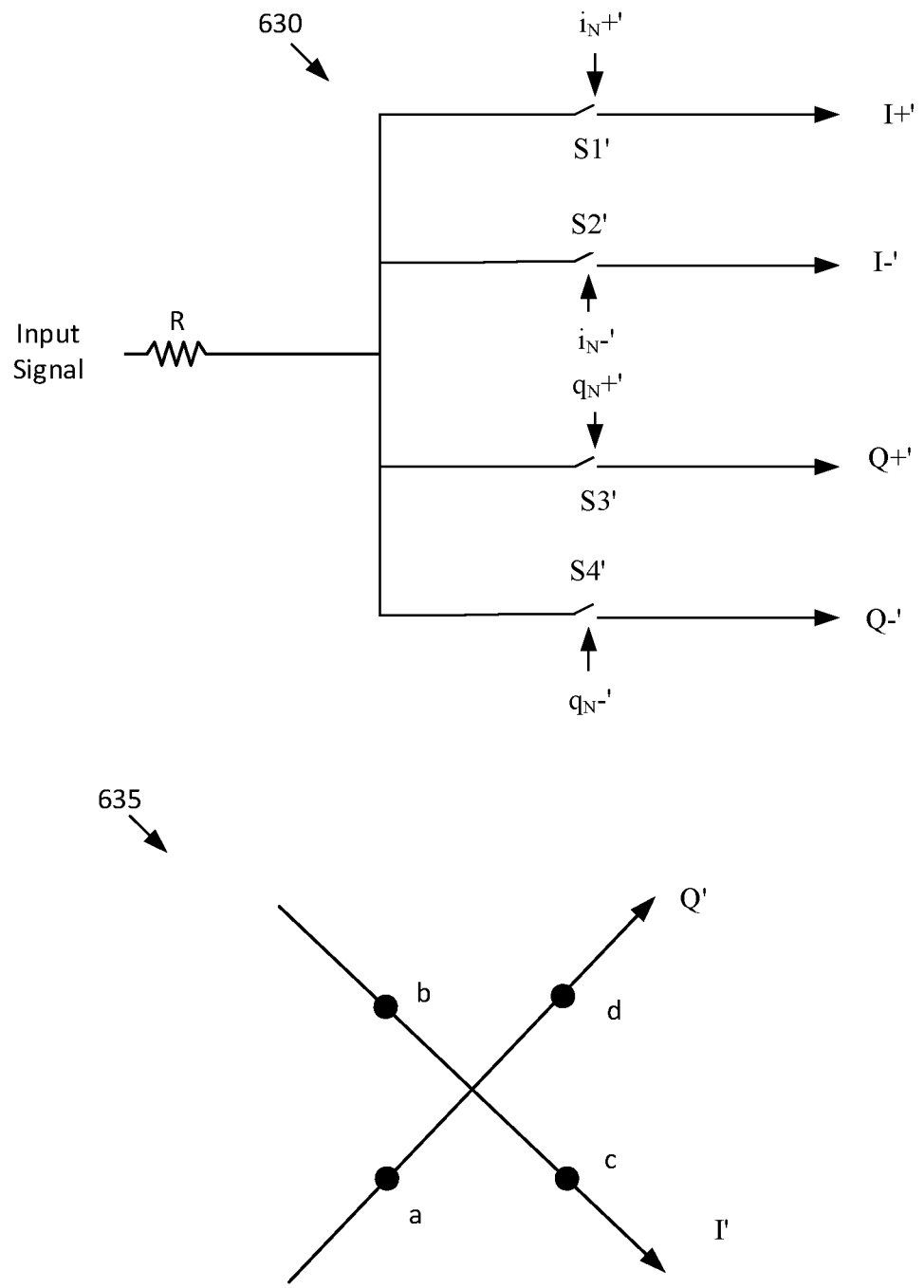
FIG. 6C illustrates a second I/Q switching mixer and a corresponding phase diagram for its output signals.

An example switching mixer 630 for such a rotated coordinate system is shown in FIG. 6C. To better appreciate the advantages of switching mixer 630, consider again the operation of switching mixer 620. For any given combination of the in-phase and quadrature-phase LO bits, one switch in each of the in-phase and quadrature-phase branches will be on. But in switching mixer 630, only one switch is on for any combination of the in-phase and quadrature-phase LO bits. Switching mixer 630 includes four switches S1' through S4' arranged in parallel between an input node and an input resistance R. To control the switches, the LO bits are transformed into a transformed set of LO bits according to a coordinate transformation. An example coordinate transformation for the I and Q phases of the output signal of switching mixer 620 into I' and Q' phases for an output signal of switching mixer 630 can be seen in a phase diagram 635. The I' and Q' phases in diagram 635 are rotated by 45 degrees with respect to the I and Q phases of diagram 625. It will be appreciated, however, that other rotation angles such as 135 degrees, 225 degrees, and 315 degrees may be used in alternative implementations.

Given this transformation, the i and q LO bits may be transformed accordingly into i' and q' LO bits. The i' bits may be denoted as first in-phase bits and the i bits as second in-phase bits. Similarly, the q' bits may be denoted as first quadrature-phase bits and the q bits as second quadrature-phase bits. Switch S1' is controlled by an $i_{N+}'$ bit to drive an I+' output terminal, switch S2' by an $i_{N-}'$ bit to drive an I−' output terminal, switch S3' by a $q_{N+}'$ bit to drive a Q+' output terminal, and switch S4 by a $q_{N-}'$ bit to drive a Q−' terminal. An example transformation between the i/q LO bits to form the i'/q' bits LO bits is shown in the following Table 1:

TABLE 1

| i+ | q+ | i+' | i−' | q+' | q−' |
|---|---|---|---|---|---|
| 0 | 0 | 0 | 1 | 0 | 0 |
| 0 | 1 | 0 | 0 | 1 | 0 |
| 1 | 0 | 0 | 0 | 0 | 1 |
| 1 | 1 | 1 | 0 | 0 | 0 |

Given this transformation, each possible state of the i and q LO bits maps to just one of the transformed i' and q' LO bits being true. Since only a single switching array is used in switching mixer 630, the magnitude of its resistance (R vs 2R) is one-half than that used in the two arrays (branches) of switching mixer 620 to provide an equivalent weighting. But the resulting amplitude of the I' and Q' output signals from switching mixer 630 are greater than the amplitude the I and Q output signals by a multiple of the square root of two. The same effective weighting in switching mixer 630 thus results in a substantially larger output signal amplitude for switching mixer 630 in comparison to switching mixer 620, which provides an improved signal-to-noise ratio. In addition, the higher output impedance of switching mixer 630 reduces noise in the downstream circuitry from the switching mixer 630.

Figure 7:
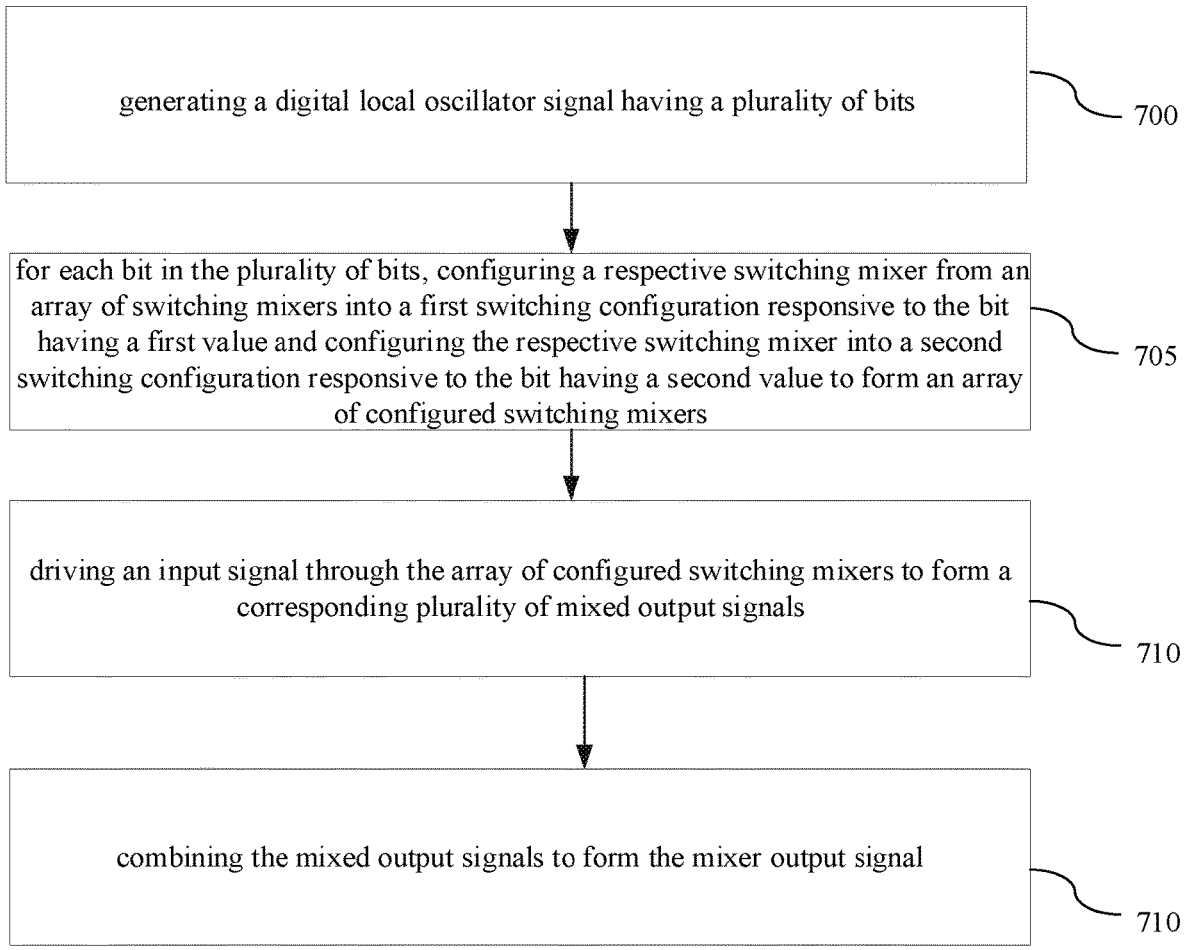
FIG. 7 is a flowchart for an example method of mixing using a switching mixer array in accordance with an aspect of the disclosure.

A mixing method to form a mixer output signal will now be discussed with regard to the flowchart of FIG. 7. The method includes an act 700 of generating a digital local oscillator signal having a plurality of bits. The generation of a digital LO signal in digital source 305 is an example of act 700. The method further includes an act 705 of, for each bit in the plurality of bits, configuring a respective switching mixer from an array of switching mixers into a first switching configuration responsive to the bit having a first value and configuring the respective switching mixer into a second switching configuration responsive to the bit having a second value to form an array of configured switching mixers. The configuration of switching mixers 310 or 315 is an example of act 705. In addition, the method includes an act 710 of driving an input signal through the array of configured switching mixers to form a corresponding plurality of mixed output signals. The propagation of the input signal through any of mixer arrays 300, 320, 400, and 500 is an example of act 710. Finally, the method includes an act 715 of combining the mixed output signals to form the mixer output signal. The combination of the mixed output signals from the switching mixers in any of mixer arrays 300, 320, 400, and 500 to form the mixer output signal is an example of act 715.

Figure 8:
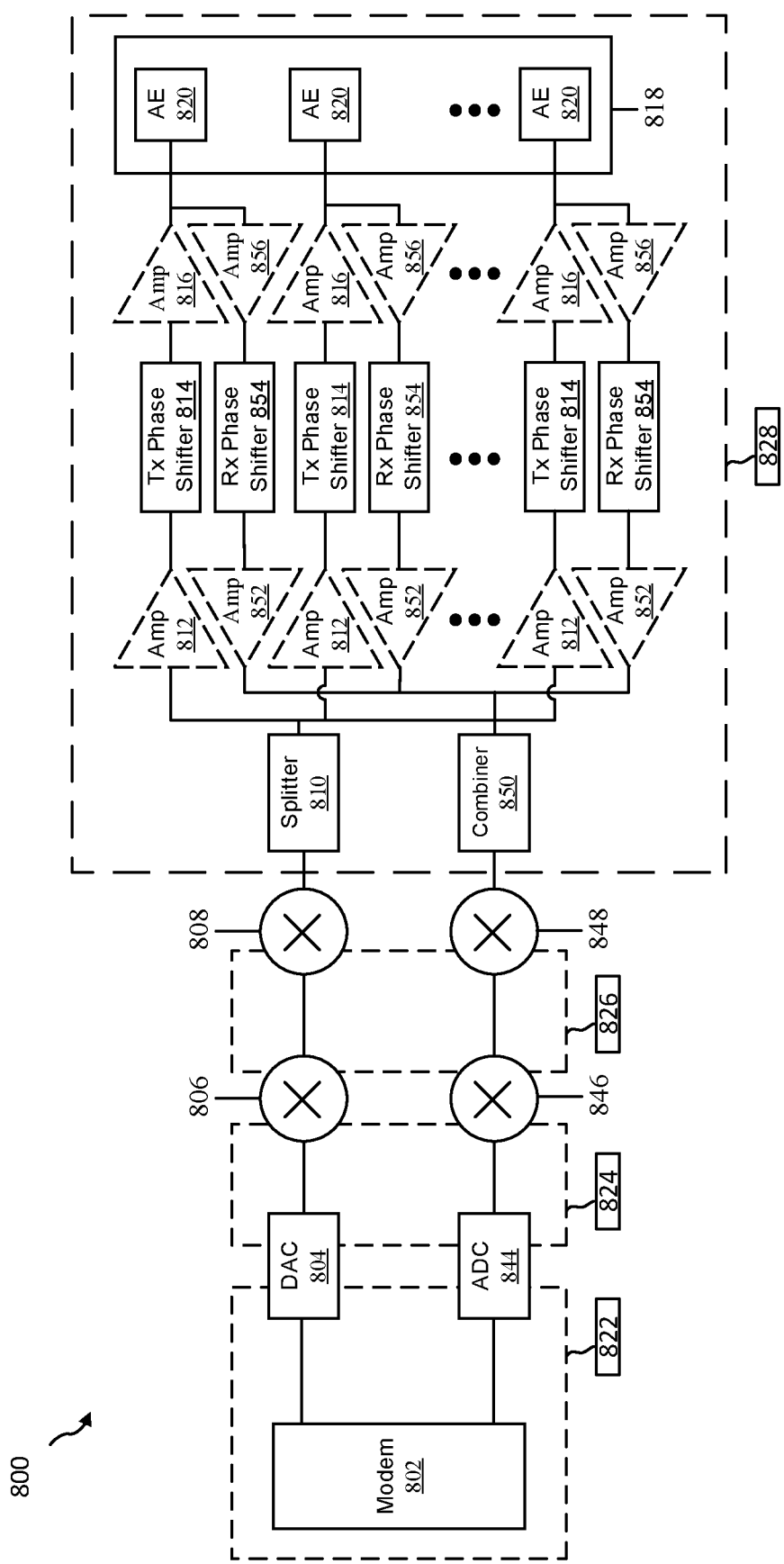
FIG. 8 illustrates an example beam-forming transceiver including switching mixer arrays in accordance with an aspect of the disclosure.

The mixer arrays as disclosed herein may also be advantageously combined with a beam-forming transceiver. An example beam-forming RF architecture 800 is shown in FIG. 8 that selectively drives an array of antennas 820 through an antenna switching network 818. In some examples, architecture 800 may implement aspects of wireless communication systems such as a first wireless device, UE, or base station) and/or a receiving device (e.g., a second wireless device, UE, or base station).

Broadly, FIG. 8 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 800 includes a modem (modulator/demodulator) 802, a digital to analog converter (DAC) 804, a first mixer 806, a second mixer 808, and a splitter 810. First mixer 806 upconverts a baseband signal to IF whereas second mixer 808 upconverts the IF signal to RF. It will be appreciated that first mixer 806 and second mixer 808 may each be implemented using a switching mixer array and a digital LO signal as disclosed herein. In alternative embodiments, a single switching mixer array may be used instead that directly upconverts from baseband to RF. The architecture 800 also includes a plurality of first amplifiers 812, a plurality of phase shifters 814, and a plurality of second amplifiers 816. Transmission lines or other waveguides, wires, traces, or the like are shown connecting the various components to illustrate how signals to be transmitted may travel between components. Boxes 822, 824, 826, and 828 indicate regions in the architecture 800 in which different types of signals travel or are processed. Specifically, box 822 indicates a region in which digital baseband signals travel or are processed, box 824 indicates a region in which analog baseband signals travel or are processed, box 826 indicates a region in which analog intermediate frequency (IF) signals travel or are processed, and box 828 indicates a region in which analog radio frequency (RF) signals travel or are processed.

Each of the antenna elements 820 may include one or more sub-elements (not shown) for radiating or receiving RF signals. For example, a single antenna element (AE) 820 may include a first sub-element cross-polarized with a second sub-element that can be used to independently transmit cross-polarized signals. The antenna elements 820 may include patch antennas or other types of antennas arranged in a linear, two dimensional, or an alternative pattern. A spacing between antenna elements 820 may be such that signals with a desired wavelength transmitted separately by the antenna elements 820 may interact or interfere (e.g., to form a desired beam). For example, given an expected range of wavelengths or frequencies, the spacing may provide a quarter wavelength, half wavelength, or other fraction of a wavelength of spacing between neighboring antenna elements 820 to allow for interaction or interference of signals transmitted by the separate antenna elements 820 within that expected range.

The modem 802 processes and generates digital baseband signals and may also control operation of the DAC 804, the digital LO signal generation, first amplifiers 812, phase shifters 814, and/or the second amplifiers 816 to transmit signals via one or more or all of the antenna elements 820. The modem 802 may process signals and control operation in accordance with a communication standard such as a wireless standard discussed herein. The DAC 804 may convert digital baseband signals received from the modem 802 (and that are to be transmitted) into analog baseband signals. The first mixer 806 upconverts analog baseband signals to analog IF signals according to a first digital LO signal. In some implementations, some processing or filtering (not shown) may take place at the IF. The second mixer 808 upconverts the analog IF signals to analog RF signals according to a second digital LO signal The modem 802 may adjust the frequency of the digital LO signals so that a desired IF and/or RF frequency is produced and used to facilitate processing and transmission of a signal within a desired bandwidth.

In the illustrated architecture 800, signals upconverted by the second mixer 808 are split or duplicated into multiple signals by the splitter 810. The splitter 810 in architecture 800 splits the RF signal into a plurality of identical or nearly identical RF signals, as denoted by its presence in box 828. In other examples, the split may take place with any type of signal including with baseband digital, baseband analog, or IF analog signals. Each of these signals may correspond to an antenna element 820 and the signal travels through and is processed by amplifiers 812, 816, phase shifters 814, and/or other elements to be provided to and transmitted by the corresponding antenna element 820 as selected for by antenna switching network 818. In one example, the splitter 810 may be an active splitter that is connected to a power supply and provides some gain so that RF signals exiting the splitter 810 are at a power level equal to or greater than the signal entering the splitter 810. In another example, the splitter 810 is a passive splitter that is not connected to power supply and the RF signals exiting the splitter 810 may be at a power level lower than the RF signal entering the splitter 810.

After being split by the splitter 810, the resulting RF signals may enter an amplifier, such as a first amplifier 812, or a phase shifter 814 corresponding to an antenna element 820. The first and second amplifiers 812, 816 are illustrated with dashed lines because one or both of them might not be necessary in some implementations. In one implementation, both the first amplifier 812 and second amplifier 816 are present. In another, neither the first amplifier 812 nor the second amplifier 816 is present. In other implementations, one of the two amplifiers 812, 816 is present but not the other. By way of example, if the splitter 810 is an active splitter, the first amplifier 812 may not be used. By way of further example, if the phase shifter 814 is an active phase shifter that can provide a gain, the second amplifier 816 might not be used. The amplifiers 812, 816 may provide a desired level of positive or negative gain. A positive gain (positive dB) may be used to increase an amplitude of a signal for radiation by a specific antenna element 820. A negative gain (negative dB) may be used to decrease an amplitude and/or suppress radiation of the signal by a specific antenna element. Each of the amplifiers 812, 816 may be controlled independently (e.g., by the modem 802) to provide independent control of the gain for each antenna element 820. For example, the modem 802 may have at least one control line connected to each of the splitter 810, first amplifiers 812, phase shifters 814, and/or second amplifiers 816 which may be used to configure a gain to provide a desired amount of gain for each component and thus each antenna element 820.

The phase shifter 814 may provide a configurable phase shift or phase offset to a corresponding RF signal to be transmitted. The phase shifter 814 could be a passive phase shifter not directly connected to a power supply. Passive phase shifters might introduce some insertion loss. The second amplifier 816 could boost the signal to compensate for the insertion loss. The phase shifter 814 could be an active phase shifter connected to a power supply such that the active phase shifter provides some amount of gain or prevents insertion loss. The settings of each of the phase shifters 814 are independent meaning that each can be set to provide a desired amount of phase shift. The modem 802 may have at least one control line connected to each of the phase shifters 814 and which may be used to configure the phase shifters 814 to provide a desired amounts of phase shift or phase offset between antenna elements 820.

In the illustrated architecture 800, RF signals received by the selected antenna elements 820 are provided to one or more of first amplifiers 856 to boost the signal strength. The boosted RF signal is input into one or more of phase shifters 854 to provide a configurable phase shift or phase offset for the corresponding received RF signal. The phase shifter 854 may be an active phase shifter or a passive phase shifter. The settings of the phase shifters 854 are independent, meaning that each can be set to provide a desired amount of phase shift or the same amount of phase shift or some other configuration. The modem 802 may have at least one control line connected to each of the phase shifters 854 and which may be used to configure the phase shifters 854 to provide a desired amount of phase shift or phase offset between antenna elements 820.

The outputs of the phase shifters 854 may be input to one or more second amplifiers 852 for signal amplification of the phase shifted received RF signals. The second amplifiers 852 may be individually configured to provide a configured amount of gain. The second amplifiers 852 may be individually configured to provide an amount of gain to ensure that the signal input to combiner 850 have the same magnitude. The amplifiers 852 and/or 856 are illustrated in dashed lines because they might not be necessary in some implementations. In one implementation, both the amplifier 852 and the amplifier 856 are present. In another, neither the amplifier 852 nor the amplifier 856 are present. In other implementations, one of the amplifiers 852, 856 is present but not the other.

In the illustrated architecture 800, signals output by the phase shifters 854 (via the amplifiers 852 when present) are combined in combiner 850. The combiner 850 in architecture 800 combines the RF signals into a signal, as denoted by its presence in box 828. The combiner 850 may be a passive combiner, e.g., not connected to a power source, which may result in some insertion loss. The combiner 850 may be an active combiner, e.g., connected to a power source, which may result in some signal gain. When combiner 850 is an active combiner, it may provide a different (e.g., configurable) amount of gain for each input signal so that the input signals have the same magnitude when they are combined. When combiner 850 is an active combiner, it may not need the second amplifier 852 because the active combiner may provide the signal amplification.

The output of the combiner 850 is input into mixers 848 and 846, each of which may be a switching mixer array using a digital LO signal as disclosed herein. In alternative embodiments, the down conversion from RF to baseband may occur in a single switching mixer array. Mixers 848 and 846 generally down convert the received RF signal to create intermediate or baseband signals that carry the encoded and modulated information. The output of the mixers 848 and 846 are input into an analog-to-digital converter (ADC) 844 for conversion to analog signals. The analog signals output from ADC 844 is input to modem 802 for baseband processing, e.g., decoding, de-interleaving, etc.

The modem 802 may function to control antenna switching network 818 to select one or more antenna elements 820 and/or to form beams for transmission of one or more signals. For example, the antenna elements 820 may be individually selected or deselected for transmission of a signal (or signals) by controlling an amplitude of one or more corresponding amplifiers, such as the first amplifiers 812 and/or the second amplifiers 816. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 820, the radiated signals interact, interfere (constructive and destructive interference), and amplify each other to form a resulting beam. The shape (such as the amplitude, width, and/or presence of side lobes) and the direction can be dynamically controlled by modifying the phase shifts or phase offsets imparted by the phase shifters 814 and amplitudes imparted by the amplifiers 812, 816 of the plurality of signals relative to each other.

The disclosure will now be summarized in the following series of clauses:

Clause 1. A multiple element mixer for an analog input signal, comprising:
a digital source configured to generate a digital local oscillator signal; and
a plurality of switching mixers, each switching mixer configured to mix a respective bit from the digital local oscillator signal with the analog input signal.

Clause 2. The multiple element mixer of clause 1, further comprising: a re-quantizer configured to re-quantize the digital local oscillator signal.

Clause 3. The multiple element mixer of any of clauses 1-2, wherein the multiple element mixer is incorporated into a transceiver configured to receive an RF signal to form the analog input signal.

Clause 4. The multiple element mixer of any of clauses 1-2, wherein the multiple element mixer is incorporated into a transceiver configured to generate a baseband signal to form the analog input signal.

Clause 5. The multiple element mixer of any of clauses 1-4, further comprising:
a dynamic matching element generator configured to scramble the digital local oscillator signal.

Clause 6. The multiple element mixer of any of clauses 1-5, wherein the plurality of switching mixers comprises a first array of binary-weighted switching mixers and a second array of equally-weighted switching mixers.

Clause 7. The multiple element mixer of clause 6, wherein each switching mixer in the first array of binary-weighted switching mixers and in the second array of equally-weighted switching is configured to process the analog input signal responsive to the respective bit from the digital local oscillator signal to form a mixed output signal.

Clause 8. The multiple element mixer of any of clauses 1-7, wherein the digital source comprises a coordinate rotation digital computer (CORDIC).

Clause 9. The multiple element mixer of any of clauses 1-8, wherein the respective bit for each switching mixer comprises a respective in-phase bit and a respective quadrature-phase bit, and wherein each switching mixer comprises:
a first switch configured to close responsive to the respective in-phase bit being true; a second switch configured to close responsive to the respective in-phase bit being false;
a third switch configured to close responsive to the respective quadrature-phase bit being true; and
a fourth switch configured to close responsive to the respective quadrature-phase bit being false.

Clause 10. The multiple element mixer of clause 9, wherein each switching mixer is further configured to close only one of the first switch, the second switch, the third switch, and the fourth switch for each sample of the respective in-phase bit and the respective quadrature-phase bit.

Clause 11. The multiple element mixer of any of clauses 1-10, wherein each switching mixer is a differential switching mixer.

Clause 12. A method of mixing to form a mixer output signal, comprising;
generating a first digital local oscillator signal having a plurality of first in-phase bits and a plurality of first quadrature-phase bits;
for each first in-phase bit and corresponding first quadrature-phase bit, configuring a respective switching mixer from an array of switching mixers by closing a first switch in the respective switching mixer responsive to the first in-phase bit being true, closing a second switch in the respective switching mixer responsive to the first in-phase bit being false, closing a third switch in the respective switching mixer responsive to the corresponding first quadrature-phase bit being true, and closing a fourth switch in the respective switching mixer responsive to the corresponding first quadrature-phase bit being false to form an array of configured switching mixers;
driving an input signal through the array of configured switching mixers to form a corresponding plurality of mixed output signals; and
combining the mixed output signals to form the mixer output signal.

Clause 13. The method of clause 12, wherein the driving of the input signal through the array of configured switching mixers comprises driving an analog RF signal through the array of configured switching mixers.

Clause 14. The method of clause 12, wherein the driving of the input signal through the array of configured switching mixers comprises driving an analog baseband signal through the array of configured switching mixers.

Clause 15. The method of any of clauses 12-14, wherein the generating of the first digital local oscillator signal comprises generating an second in-phase local oscillator signal having a plurality of second in-phase bits and second quadrature-phase bits, the method further comprising:
transforming the second in-phase bits and the second quadrature-phase bits responsive to a coordinate rotation into the plurality of first in-phase bits and the plurality of second quadrature-phase bits.

Clause 16. The method of clause 15, wherein the coordinate rotation is approximately 45 degrees.

Clause 17. A multiple element mixer for an analog input signal, comprising:
a digital source configured to generate a digital local oscillator signal having a first plurality of bits;
a re-quantizer configured to re-quantize the digital local oscillator signal into a re-quantized digital local oscillator signal having a second plurality of bits that is smaller than the first plurality of bits, the second plurality of bits including a set of most significant bits and a set of least significant bits;

a segmented dynamic element matching (DEM) generator configured to generate a first set of DEM scrambled bits from the set of most significant bits and to generate a second set of DEM scrambled bits from the set of least significant bits;

a plurality of first switching mixers, each first switching mixer configured to mix a respective bit from the first set of DEM scrambled bits with the analog input signal to drive an output terminal configured to provide a mixer output signal; and a plurality of second switching mixers, each second switching mixer configured to mix a respective bit from the second set of DEM scrambled bits with the analog input signal to drive the output terminal.

Clause 18. The multiple element mixer of clause 17, wherein each first switching mixer in the plurality of first switching mixers is equally weighted and wherein the plurality of second switching mixers is binary weighted.

Clause 19. The multiple element mixer of any of clauses 17-18, wherein each first switching mixer and each second switching mixer comprises a differential switching mixer.

Clause 20. The multiple element mixer of any of clauses 17-18, wherein each first switching mixer and each second switching mixer comprises a single-ended switching mixer.

Clause 21. The multiple element mixer of clause 18, wherein the plurality of second switching mixers is organized into pairs of second switching mixers.

Clause 22. The multiple element mixer of any of clauses 17-21, wherein the digital source comprises a coordinate rotation digital computer (CORDIC).

Clause 23. The multiple element mixer of any of clauses 17-21, wherein the digital source comprises a lookup table.

Clause 24. The multiple element mixer of any of clauses 17-23, wherein the multiple element mixer is integrated into a cellular telephone transceiver.

Clause 25. The multiple element mixer of any of clauses 17-24, wherein the output terminal comprises an active combining network.

Clause 26. The multiple element mixer of any of clauses 17-24, wherein the output terminal comprises a passive combining network.

Clause 27. A multiple element mixer for an analog input signal, comprising:

means for generating a digital local oscillator signal having a plurality of bits; and a plurality of switching means corresponding to the plurality of bits, each switching means for mixing a respective bit from the plurality of bits with an input signal to form a switching mixer output signal; and means for combining the switching mixer output signals to form a mixer output signal.

Clause 28. The multiple element mixer of clause 28, wherein the input signal is selected group consisting of an in-phase input signal and a quadrature-phase input signal.

Clause 29. The multiple element mixer of any of clauses 27-28, further comprising: means for re-quantizing the digital local oscillator signal.

Clause 30. The multiple element mixer of any of clauses 27-29, wherein the plurality of switching means is segmented into a first plurality of switching means and a second plurality of switching means.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A multiple element mixer for an analog input signal, comprising:
   a digital source configured to generate a digital local oscillator signal having a plurality of bits; and
   a plurality of switching mixers, each switching mixer including a first switch and a second switch configured to mix the analog input signal with a respective bit from the plurality of bits, wherein each switching mixer has a first switching state in which the first switch is closed and the second switch is opened responsive to a first binary value of the respective bit and has a second switching state in which the first switch is open and the second switch is closed responsive to a second binary value of the respective bit.

2. The multiple element mixer of claim 1, further comprising:
   a re-quantizer configured to re-quantize the digital local oscillator signal.

3. The multiple element mixer of claim 1, wherein the multiple element mixer is incorporated into a transceiver configured to receive a radio frequency signal to form the analog input signal.

4. The multiple element mixer of claim 1, wherein the multiple element mixer is incorporated into a transceiver configured to generate a baseband signal to form the analog input signal.

5. The multiple element mixer of claim 1, further comprising:
   a dynamic element matching generator configured to scramble the digital local oscillator signal.

6. The multiple element mixer of claim 1, wherein the plurality of switching mixers comprises a first array of binary-weighted switching mixers and a second array of equally-weighted switching mixers.

7. The multiple element mixer of claim 6, wherein each switching mixer in the first array of binary-weighted switching mixers and in the second array of equally-weighted switching mixers is configured to process the analog input signal responsive to the respective bit from the digital local oscillator signal to form a mixed output signal.

8. The multiple element mixer of claim 1, wherein the digital source comprises a coordinate rotation digital computer (CORDIC).

9. The multiple element mixer of claim 1, further comprising:
   a negative in-phase output node;
   a positive quadrature-phase output node; and
   a negative quadrature-phase output node, and wherein the respective bit for each switching mixer comprises a respective in-phase bit and a respective quadrature-phase bit, and wherein each switching mixer further comprises:
   a third switch; and
   a fourth switch, wherein the first switch is configured to close responsive to the respective in-phase bit being true to pass the analog input signal to the positive in-phase output node, the second switch is configured to close responsive to the respective in-phase bit being false to pass the analog input signal to the negative in-phase output node, the third switch is configured to close responsive to the respective quadrature-phase bit being true to pass the analog input signal to the positive quadrature-phase output node, and the fourth switch is configured to close responsive to the respective quadrature-phase bit being false to pass the analog input signal to the negative quadrature-phase output node.

10. The multiple element mixer of claim 9, wherein each switching mixer is further configured to close only one of the first switch, the second switch, the third switch, and the fourth switch for each sample of the digital local oscillator signal.

11. The multiple element mixer of claim 1, wherein each switching mixer is a differential switching mixer.

12. A method of mixing to form a mixer output signal, comprising:
generating a first digital local oscillator signal having a plurality of first in-phase bits and a plurality of first quadrature-phase bits;
for each first in-phase bit and corresponding first quadrature-phase bit, configuring a respective switching mixer from an array of switching mixers by closing a first switch in the respective switching mixer responsive to the first in-phase bit being true, closing a second switch in the respective switching mixer responsive to the first in-phase bit being false, closing a third switch in the respective switching mixer responsive to the corresponding first quadrature-phase bit being true, and closing a fourth switch in the respective switching mixer responsive to the corresponding first quadrature-phase bit being false to form an array of configured switching mixers;
driving an input signal through the array of configured switching mixers to form a corresponding plurality of mixed output signals; and
combining the mixed output signals to form the mixer output signal.

13. The method of claim 12, wherein the driving of the input signal through the array of configured switching mixers comprises driving an analog radio frequency signal through the array of configured switching mixers.

14. The method of claim 12, wherein the driving of the input signal through the array of configured switching mixers comprises driving an analog baseband signal through the array of configured switching mixers.

15. The method of claim 12, wherein the generating of the first digital local oscillator signal comprises generating a second in-phase local oscillator signal having a plurality of second in-phase bits and second quadrature-phase bits, the method further comprising:
transforming the second in-phase bits and the second quadrature-phase bits responsive to a coordinate rotation into the plurality of first in-phase bits and the plurality of second quadrature-phase bits.

16. The method of claim 15, wherein the coordinate rotation is approximately 45 degrees.

17. A multiple element mixer for an analog input signal, comprising:
a digital source configured to generate a digital local oscillator signal having a first plurality of bits;
a re-quantizer configured to re-quantize the digital local oscillator signal into a re-quantized digital local oscillator signal having a second plurality of bits that is smaller than the first plurality of bits, the second plurality of bits including a set of most significant bits and a set of least significant bits;
a segmented dynamic element matching (DEM) generator configured to generate a first set of DEM scrambled bits from the set of most significant bits and to generate a second set of DEM scrambled bits from the set of least significant bits;
a plurality of first switching mixers, each first switching mixer configured to mix a respective bit from the first set of DEM scrambled bits with the analog input signal to drive an output terminal configured to provide a mixer output signal; and
a plurality of second switching mixers, each second switching mixer configured to mix a respective bit from the second set of DEM scrambled bits with the analog input signal to drive the output terminal.

18. The multiple element mixer of claim 17, wherein each first switching mixer in the plurality of first switching mixers is equally weighted and wherein the plurality of second switching mixers is binary weighted.

19. The multiple element mixer of claim 18, wherein the plurality of second switching mixers is organized into pairs of second switching mixers.

20. The multiple element mixer of claim 17, wherein the digital source comprises a coordinate rotation digital computer (CORDIC).

21. The multiple element mixer of claim 17, wherein the digital source comprises a lookup table.

22. The multiple element mixer of claim 17, wherein the output terminal comprises an active combining network.

23. The multiple element mixer of claim 17, wherein the output terminal comprises a passive combining network.

24. A multiple element mixer for an analog input signal, comprising:
an output node;
means for generating a digital local oscillator signal having a plurality of bits;
a plurality of switching mixers, each switching mixer including a first switch and a second switch configured to mix the analog input signal with a respective bit from the plurality of bits to form a switching mixer output signal, wherein each switching mixer has a first switching state in which the first switch is closed and the second switch is opened responsive to a first binary value of the respective bit and has a second switching state in which the first switch is open and the second switch is closed responsive to a second binary value of the respective bit; and
means for combining the switching mixer output signals to form a mixer output signal at the output node.

25. The multiple element mixer of claim 24, wherein the analog input signal is selected from a group consisting of an in-phase input signal and a quadrature-phase input signal.

26. The multiple element mixer of claim 24, further comprising:
means for re-quantizing the digital local oscillator signal.

27. The multiple element mixer of claim 24, wherein the multiple element mixer is incorporated into a transceiver configured to generate a baseband signal to form the analog input signal.

* * * * *